United States Patent [19]

Kleiman

[11] Patent Number: 4,493,449
[45] Date of Patent: Jan. 15, 1985

[54] SOLDERING TOOL FOR A ROBOT

[75] Inventor: William J. Kleiman, Cedar Rapids, Iowa

[73] Assignee: Rockwell International Corporation, El Segundo, Calif.

[21] Appl. No.: 447,041

[22] Filed: Dec. 6, 1982

[51] Int. Cl.³ .................... B23K 3/00; B23K 37/02
[52] U.S. Cl. ................................ 228/7; 228/41; 228/45; 228/57
[58] Field of Search ............... 228/41, 45, 102, 57, 228/7

[56] References Cited

U.S. PATENT DOCUMENTS 3,797,725  3/1974  Mori et al. ..................... 228/41
4,042,161  8/1977  Ando ............................ 228/102

FOREIGN PATENT DOCUMENTS 36069  2/1982  Japan ........................... 228/41

Primary Examiner—Kenneth J. Ramsey
Attorney, Agent, or Firm—Robert C. Mayes; H. Fredrick Hamann; George A. Montanye

[57] ABSTRACT

A soldering apparatus is disclosed for attachment to a positioning robot arm. A soldering iron and a supply of solder are combined on an accessory tool and additionally the robot has the capability of periodically cleaning the soldering iron to maintain a high degree of repetitive quality. Additionally the time to accomplish repetitive soldering functions is significantly reduced.

12 Claims, 2 Drawing Figures

SOLDERING TOOL FOR A ROBOT

BACKGROUND OF THE INVENTION

This invention relates to soldering tools in general and specifically to automatic soldering tools utilized by automatons.

Recent developments in assembly line techniques have involved the increase in use of automatons or robots to provide a rapid and precisely repeatable worker on an assembly line which does not require meal breaks, suffer from fatigue, or become bored with excessively menial and boring tasks.

Soldering is a common assembly line task which can be particularly boring or tiring to a human if the device to be soldered has a large number of essentially similar contacts to be soldered or there are large numbers of devices with the same task essentially repeated over a period of time.

The conversion of a soldering tool to an automaton has several problems inherent in that endeavor in that:

a. the tool rapidly becomes coated with residue of either rosin or acid core flux and particulate contaminants and thereby has the potential to contaminate work pieces;

b. providing solder at the precise time and in the correct amounts required by the work piece mass and heat transfer capability of the iron in conjunction with a particular work piece.

SUMMARY AND BRIEF DESCRIPTION OF THE DRAWINGS

Accordingly, it is an object of the present invention to provide an automatic soldering tool capable of maintaining a clean and efficient heat transfer surface.

Another object of the present invention is to provide a soldering apparatus capable of adjusting to the variety of work pieces with respect to varying masses and heat transfer characteristics such that solder may be applied at the proper time and in the proper amounts.

Briefly, in accordance with the present invention, a soldering tool for an automaton is disclosed comprising a frame assembly for mounting the tool to the automaton, means for providing heat to a specified location on a work piece, the heating means attached to the frame assembly, means for guiding solder to the specified location upon command mounted on the frame assembly, means for cleaning the heating means in cooperation with the automaton, and means for interconnection to the automaton wherein the automaton is for providing temperature control, timing control, and position control for the tool.

A soldering tool as above, wherein the temperature control and timing control may together comprise a timed heating element. Thus, by controlling the duration of an applied current to the heating element in a soldering iron, the temperature of the soldering iron may be precisely controlled as well as the time of the heat application.

A soldering tool as above wherein the timing control and position control additionally may comprise an automaton actuated movement apparatus responding to timing controls in the automaton. The automaton in one embodiment in addition to providing precision position control for the tool, additionally provides means for moving a portion of the tool, i.e., the heating element, away from the rest of the tool so that the tip of the soldering iron may thereby be cleaned. This separate positioning control, in one embodiment, comprises a pneumatic cylinder wherein the automaton activates the air line to the pneumatic cylinder to provide the movement to the heating element.

A soldering tool in accordance with the present invention additionally has a means for guiding solder which comprises, in combination: an electric motor actuated by the automaton and attached to the tool; solder drive means in cooperation with the motor for gripping the solder when the motor is inactive and for moving the solder when the motor is active; and a guide tube in cooperation with the drive means for precisely locating the solder travel path.

In one embodiment, the soldering tool mounted on the arm of an automaton has a heating capability in cooperation with a means for providing solder, wherein the control unit of the automaton locates the tool and times the heating duration and separately determines the time for providing solder, whereby the heating duration is a function of the work piece mass and solder melt temperature, and the time for providing solder is a function of the work piece heatsink capability.

An apparatus utilizing the present invention in conjunction with an automaton may comprise an independently programmable work station on an assembly line, or may comprise one of a plurality of work stations, each work station controlled by a central processor, wherein the processor maintains overall control of the relative operations of each work station to the others. In this configuration, the soldering tool becomes one of a number of tools applied to a specific work piece and either simultaneously or in sequence provides for the soldering function under the control of the overall relative operations of each of the tools applied to the work piece.

DETAILED DESCRIPTION OF THE INVENTION

Figure 1:
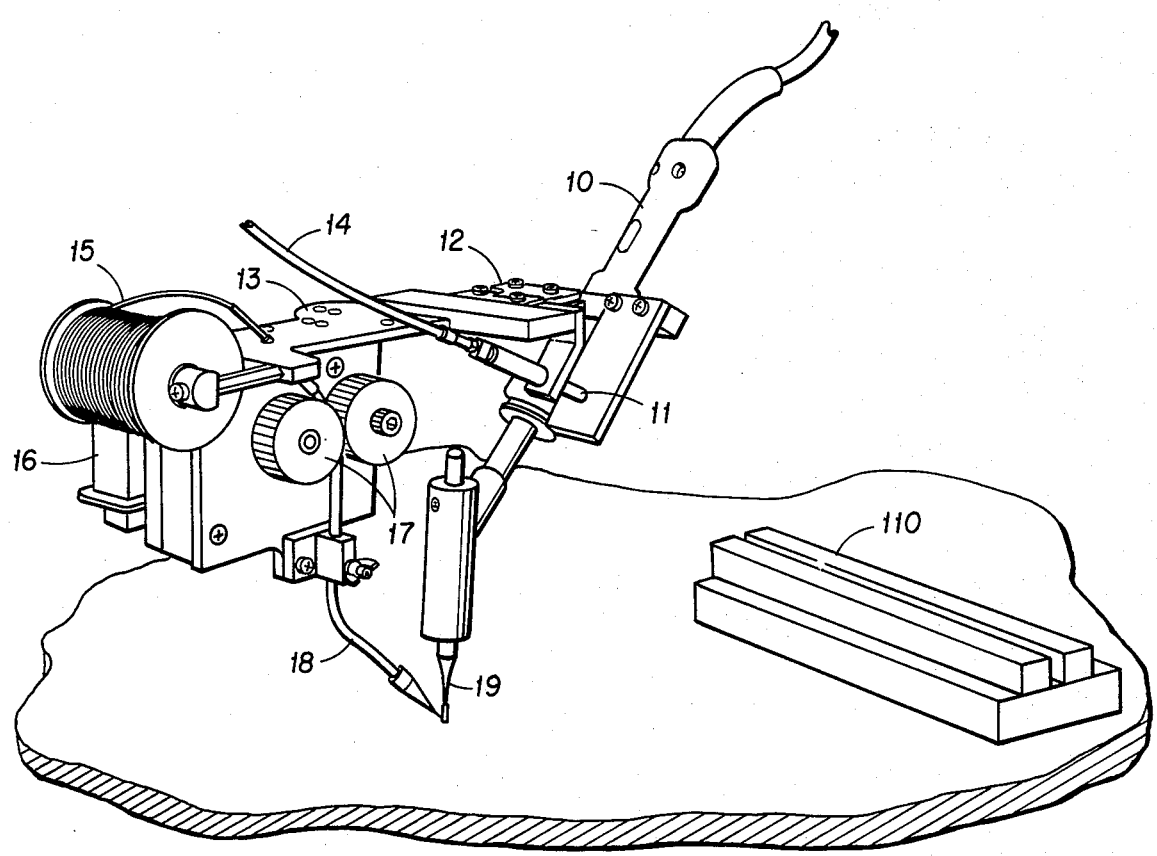
FIG. 1 is a perspective view of a soldering tool constructed in accordance with the present invention.

Referring now to FIG. 1, a perspective view schematic drawing of one embodiment of the present invention is shown having a conventional soldering iron 10 attached to the tool frame assembly 13 by means of a spring loaded hinge 12. The air supply line 14 operates the air cylinder 11 against a portion of the spring loaded mount upon which soldering iron 10 is mounted. A 6 RPM motor 16 was mounted on the frame assembly 13 and operated through rubber feed wheels 17 to drive solder from solder wheel 15 through solder guide 18 to the tip 19 of the soldering iron.

In operation, the soldering iron is either kept hot at all times by application of power to the heating element contained therein or the power to the soldering iron may be switched through computer control to apply heat to the tip of the soldering iron only when that heat is required.

The spring loaded hinge 12 enables the soldering iron tip 19 to remain in close proximity to the solder guide 18 when soldering.

Cleaning pad 110 was placed apart from the soldering tool and was positioned at a known relative position to the automaton operating the soldering tool. Upon completion of a prescribed number of soldering operations, the automaton proceeds to move the tool to a position in proximity to the cleaning pad 110, then actuates through air supply line 14 the air cylinder 11 causing the soldering iron 10 to swing in such a manner that the soldering iron tip 19 is no longer in close proximity to solder guide 18. Thereafter the automaton inserts the soldering iron tip 19 into the cleaning pad 110, normally a heat resistance scrubbing material, until a sufficient amount of time has elapsed and movement has occurred to essentially clean tip 19 from any remaining soldering residue. At this point, the automaton causes the air cylinder 11 to return to a collapsed state and the spring loaded hinge 12 operates to return soldering iron 10 to its first position wherein its tip is once again located in proximity to the solder guide tube 18.

Figure 2:
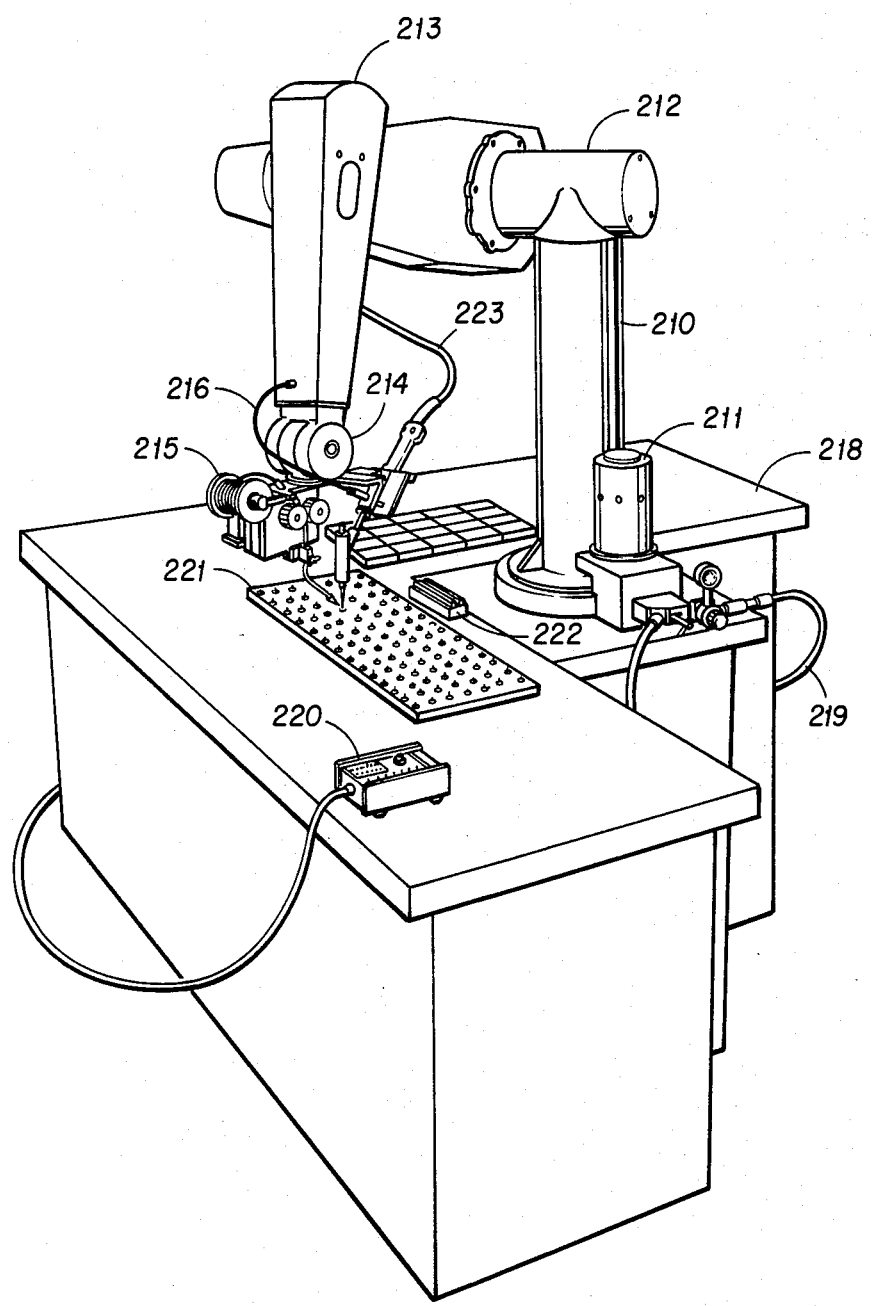
FIG. 2 is a perspective view of an automaton apparatus having a soldering tool mounted thereon in proper relationship with the automaton and a work piece.

Referring now to FIG. 2, a soldering apparatus in accordance with the present invention is shown having solder tool 215 mounted on arm 213 of an industrial robot or automaton 210. The automaton provides rotational motion in three axes by the use of pivots and motors 211, 212, and 213, respectively. This enables the positioning of the working tip of the robot arm to be positioned precisely at a known position relative to the automaton. Additionally, the wrist 214 of the automaton enables rotational motion in two axis allowing for precise location of the soldering tool with respect to the automaton. The automaton 210 may be operated by the manual controller 220 or by internal electrical controls or an external electrical control unit, not shown. The automaton 210 is mounted on work table 218 to which is supplied a high pressure air line 219 for regulation prior to entering the automaton control solenoid unit, internal to the automaton.

The automaton or the control unit controlling the automaton manages the air pressure in air supply line 216 connected from the automaton arm 213 to the soldering tool 215. Additional connections to the soldering tool include the electrical power line 223 providing heat power to the soldering iron, which also is controlled, in one embodiment, by the automaton control unit. Additionally, a switched signal control is applied to the motor of the soldering tool shown as FIG. 16 in FIG. 1 such that the solder feed mechanism operates upon command by the application of the proper switch signal. Cleaning pad 222 is located at a specified and fixed position on work table 218 and in proximity to work piece 221 to save time in moving the soldering tool from the work piece to the cleaning pad and return during operations.

In actual operation, the soldering tool 215 is positioned precisely to apply a specified amount of heat to a work piece and thereafter the motor turns the feed wheels to provide solder through the solder guide tube to the tip of the soldering iron, and therefore, to the work piece itself. The duration of the operation of the motor defines the amount of solder that will be provided; therefore the operator has the option of waiting until the work piece is thoroughly heated to a proper melt temperature prior to application of any solder, and then precisely delivering the required amount of solder to the work piece while the heat is still being applied by the soldering iron.

Additionally, after a sufficient amount of time has passed to allow an even flow of solder, the tool is moved, for example, directly up from the work piece and prevents addition solder from being delivered through the guide tube by firmly clamping the solder.

While the present description of the invention is made with respect to a specific embodiment, it can be seen that the present invention is not limited to that embodiment but may be adapted to a variety of applications as may become obvious to those skilled in the art. For example, the soldering accessory may be constructed so that the tool functions to solder a work piece approached from the underside or from the side of a work piece or while a work piece is moving on an assembly line. Since modifications to the foregoing description may occur to those skilled in the art which very well may not constitute a departure from the scope and spirit of the invention, the description is intended to be merely exemplary and it is therefore contemplated that the appended claims will cover any such modification of embodiments as fall within the true scope of the invention.

What is claimed is:

1. A soldering tool for a robot comprising:
    a. a frame assembly for mounting said tool to said robot;
    b. means for providing heat to a specified location on a workpiece, said heating means attached to said frame assembly;
    c. means for guiding solder to said specified location upon command mounted on said frame assembly;
    d. means for cleaning said heating means in cooperation with said robot; and
    e. means for interconnection to said robot wherein said robot is for providing temperature control, timing control, and position control for said tool.

2. A soldering tool as in claim 1 wherein said temperature control and said timing control comprise a timed heating element.

3. A soldering tool as in claim 1 wherein said timing control and position control comprise a robot actuated movement apparatus responding to timing controls in said robot.

4. A soldering tool as in claim 3 wherein said robot actuated movement apparatus comprises a pneumatic cylinder.

5. A soldering tool as in claim 1 wherein said means for providing heat to a specified location comprises a soldering iron.

6. A soldering tool as in claim 1 wherein said means for guiding solder comprises in combination:
    a. an electric motor actuated by said robot and attached to said tool;
    b. solder drive means in cooperation with said motor for gripping said solder when said motor is inactive and for moving said solder when said motor is active; and
    c. a guide tube in cooperation with said drive means for precisely locating the solder travel path.

7. An automatic soldering apparatus comprising:
    a. an electronic control unit;
    b. a frame assembly for housing said control unit;
    c. movable arm means attached to said frame and operable to move to positions and at times controlled by said control unit;
    d. a soldering tool mounted on said arm and having a heating capability in cooperation with a means for providing solder, wherein said control unit locates said tool and times the heating duration and separately determines the time for providing solder, whereby the heating duration is a function of the workpiece mass and solder melt temperature, and the time for providing solder is a function of the workpiece heatsink capability; and means for cleaning said soldering tool additionally controlled by said control unit.

8. A soldering apparatus comprising:

a. a robot having a moveable arm;

b. an accessory frame member mounted on said arm;

c. a soldering iron hingedly mounted on said accessory frame member and in electrical communication with said robot;

d. an air actuated cylinder mounted upon said accessory frame member, operable to move said soldering iron upon said hinged mounting, said cylinder in pneumatic communication with said robot; and e. a solder guide mechanism for providing solder to a desired location upon command mounted upon said accessory frame member.

9. A soldering apparatus as in claim 8 wherein said solder guide mechanism comprises in combination:

a. a motor in electrical communication with said robot and mounted on said accessory frame member;

b. a solder reel mounted on said frame member;

c. a feed mechanism operable in response to said motor to feed solder from said reel; and d. a solder guide assembly in cooperation with said solder reel and said feed mechanism to guide solder to said desired location.

10. An apparatus as in claim 9 wherein said feed mechanism additionally and in response to said motor, prevents solder movement with respect to said guide assembly while said soldering iron is moving in response to said air actuated cylinder.

11. An apparatus as in claim 8 wherein said robot comprises an independently programmable work station on an assembly line.

12. An apparatus as in claim 8 wherein said robot comprises one of a plurality of workstations, each workstation controlled by a central processor wherein said processor maintains overall control of the relative operations of each workstation to the others.

* * * * *